Sept. 6, 1927. 1,641,224
E. R. GURNEY
FRONT WHEEL CONSTRUCTION
Filed Aug. 7. 1926 2 Sheets-Sheet 1

Sept. 6, 1927.

E. R. GURNEY 1,641,224

FRONT WHEEL CONSTRUCTION

Filed Aug. 7, 1926

Patented Sept. 6, 1927.

1,641,224

UNITED STATES PATENT OFFICE.

ERVING R. GURNEY, OF NEW YORK, N. Y., ASSIGNOR TO INTERNATIONAL MOTOR COMPANY, OF NEW YORK, N. Y., A CORPORATION OF DELAWARE.

FRONT-WHEEL CONSTRUCTION.

Application filed August 7, 1926. Serial No. 127,838.

This invention relates to a wheel structure for motor vehicles and has especial reference to disc wheels having braking mechanism associated therewith and adapted to be used as the steering wheels of the vehicle.

The object of the present invention is to provide a structure which shall be practical from the standpoint of manufacture and use, wherein the component elements have the requisite strength for the purpose at hand and are so disposed as to function efficiently when combined in compact relation within the limits of standardized motor vehicle wheels. Accordingly, the axle is supported by the wheel through the instrumentality of a unitary T-shaped knuckle and knuckle-pin structure having a passage therethrough for the wheel spindle of a disc wheel. A brake drum is carried by the disc wheel and is disposed in a plane including the knuckle pin so that the brake actuating mechanism may be positioned in the axis of the knuckle pin in order to be operable when steering. Brake shoes are pivoted upon anchors depending upon either side of the steering knuckle from bosses formed thereon and a cam to expand the shoes displaces bearing members reciprocal in a bracket carried above the steering knuckle. The bearing races for the wheel spindle are disposed outwardly of the steering knuckle on the outer end thereof between the brake drum and the wheel disc, and are positioned at that end between a cylindrical flange on the wheel disc and a collar on the steering knuckle. On the inner end the bearing races are disposed within the steering knuckle.

In order that the invention may be clearly understood and readily carried into effect the same will now be described more fully in connection with the following detailed description of a preferred embodiment thereof which is illustrated in the accompanying drawings and in which.

Figure 1:
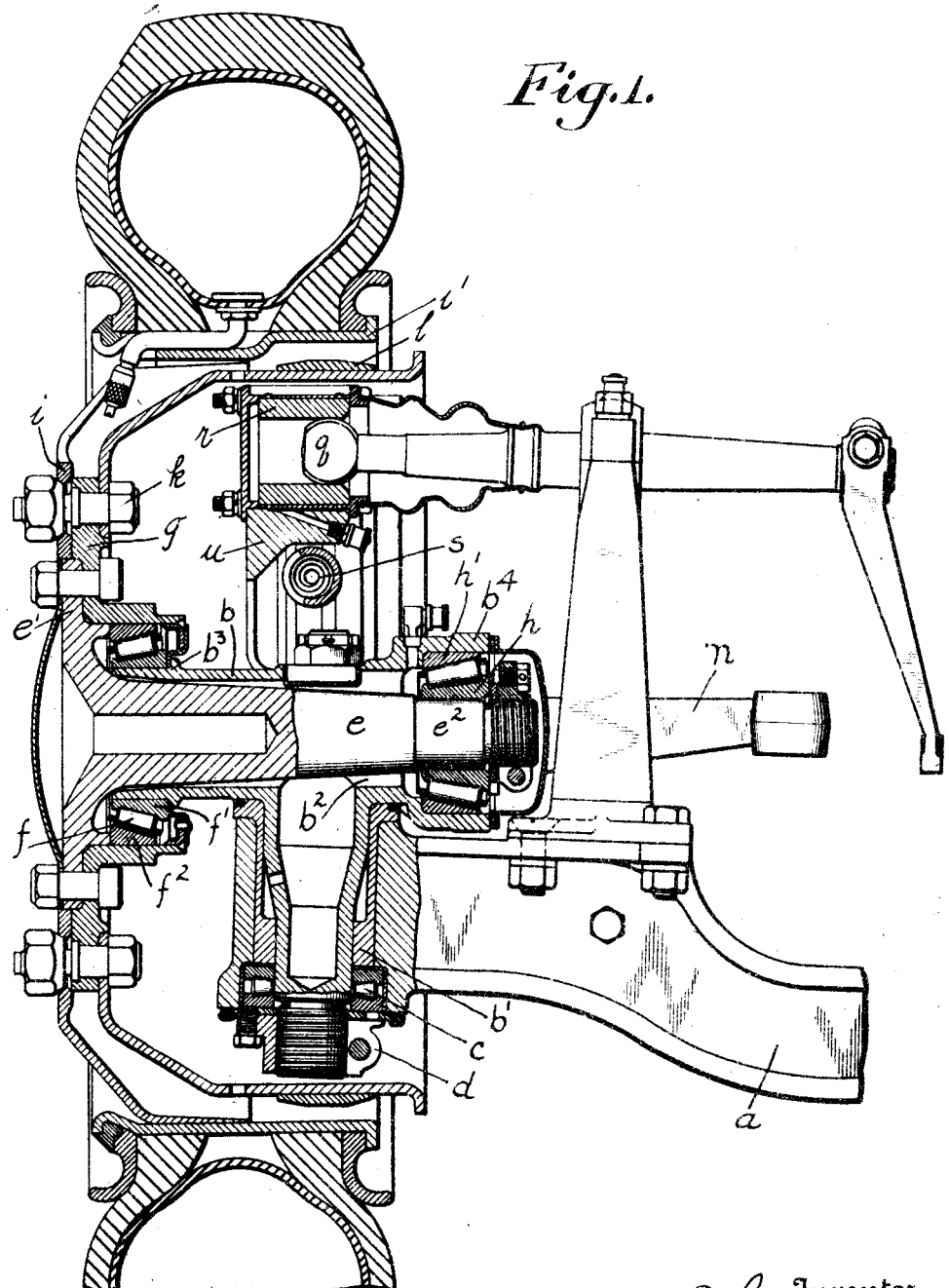
Figure 1 is a view in transverse vertical section showing the wheel and brake mechanism according to the present invention.
Figure 2:
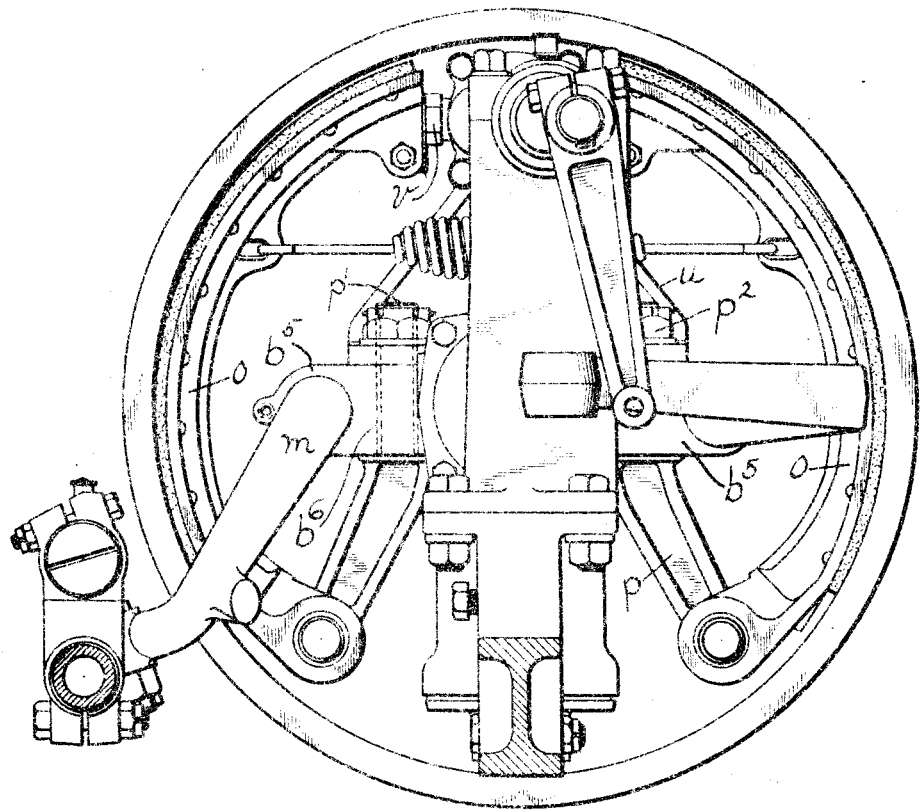
Figure 2 is a view in side elevation looking from the right in Figure 1 and showing the brake mechanism in greater detail.

The axle $a$ is suspended from a unitary T-shaped knuckle and knuckle pin structure $b$ through the instrumentality of roller bearings $c$ supported by a lock nut $d$ engaging the lower end of the knuckle pin portion $b'$. This knuckle structure $b$ is hollow and the steering knuckle portion is formed as a passage $b^2$ for the wheel spindle $e$. Outwardly the wheel spindle is supported in roller bearings $f$ disposed between the wheel disc and the knuckle pin in bearing races on the outer or circumferential surface of the steering knuckle, the inner bearing race $f'$ of the pair being positioned by means of a collar $b^3$ on the steering knuckle and the outer bearing race $f^2$ being carried by an annulus $g$ bolted to a flange $e'$ formed on the outer end of the wheel spindle. The spindle tapers inwardly and its inner end $e^2$ is of reduced cylindrical form to receive the bearing race member $h$ cooperating with a bearing race $h'$ in the enlarged inner end $b^3$ of the steering knuckle, the internal diameter of which is increased at that point to receive the bearing race. This bearing is disposed substantially without the inner marginal surface of the wheel. The annulus $g$ also serves as a support for the wheel disc $i$ which may be of pressed metal and may have formed thereon a rim receiving portion $i'$ for a pneumatic tire. Inwardly the annulus $g$ has secured thereto a brake drum $j$ preferably by the same bolts $k$ which secure the wheel disc thereto. The brake drum is reinforced against the expanding brake shoes by a ring $l$.

As is customary, the steering knuckle is provided with an arm $m$ rearwardly thereof to which the steering connection is attached while forwardly there is disposed an arm $n$ for the drag link connecting the steering knuckles of the two front wheels. These arms are carried by bosses $b^4$ formed on the steering knuckle which serve as supports for the brake mechanism.

Because of the presence of the steering device and the necessity for freedom of movement, two brake shoes $o$, $o$ are provided adapted to expand against the interior surface of the brake drum one on each side of the steering knuckle. The brake shoes are pivoted at their lowermost ends upon downwardly diverging arms $p$ bolted to the extensions $b^5$ formed on the steering knuckle. Preferably stud bolts $p'$ threaded into the arms $p$ extend through passages $b^6$ in the bosses $b^5$ to receive the nuts $p^2$. The upper ends of the brake shoes are adapted to be separated for frictional engagement with the brake drum by means of the cam element q seated within a brake shoe wear plate r which bears against the brake shoe adjusting bolts v to expand them against the action of the return spring s. It will be observed from an inspection of the drawings that the brake shoe wear plate is supported from the steering knuckle by the bifurcated frame u which is secured thereto by the same stud bolts which secure the brake anchors to the steering knuckle.

It will thus be seen that a wheel structure has been provided wherein the necessary steering and braking devices are incorporated compactly and yet with ample space within which to function, the disposition of the bearings being upon the respective sides of the brake drum and steering devices which are operable in the same general plane in order to be efficacious when the plane of the wheel varies during steering.

Modifications in the configuration of the component elements will occur to those skilled in the art and are to be deemed within the scope of the invention as set forth in the appended claims.

What is claimed is:

1. In a brake mounting T-shaped unitary steering knuckle and knuckle pin structure having a passage for a wheel spindle and formed on either side of the knuckle portion with independent bosses disposed in the plane of the knuckle pin transverse to the axis of the passage and means to secure a brake anchor thereto.

2. In a brake mounting T-shaped unitary steering knuckle and knuckle pin structure having a passage for a wheel spindle and formed on either side of the knuckle portion with a boss disposed in the plane of the knuckle pin transverse to the axis of the passage means to secure a brake anchor thereto, said knuckle portion being formed in its upper surface with a seat in the plane of the bosses, and a bracket on the seat supporting the brake actuating devices.

3. In a brake mounting T-shaped unitary steering knuckle and knuckle pin structure having a passage for a wheel spindle and formed on either side of the knuckle portion with a boss disposed in the plane of the knuckle pin transverse to the axis of the passage and adapted to have a brake anchor secured thereto, said knuckle portion being formed in its upper surface with a seat in the plane of the bosses, for a bracket supporting brake actuating devices and bolts to secure the anchors and bracket to the bosses respectively.

4. In a brake mounting, in combination, a steering knuckle formed with bosses, depending brake anchors supported from the bosses, respectively, a bracket supported on the bosses, bolts passing through the bosses to secure the anchors and bracket thereto, brake shoes pivoted on the anchors, respectively, and separable bearings reciprocal in the bracket to expand the brake shoes.

This specification signed this 2nd day of August, A. D. 1926.

ERVING R. GURNEY.